UNITED STATES PATENT OFFICE.

GEORGE FRANÇOIS JAUBERT, OF PARIS, FRANCE.

BRIQUET FOR MAKING OXYGEN.

965,631.  Specification of Letters Patent.  Patented July 26, 1910.

No Drawing.  Application filed April 24, 1906.  Serial No. 313,509.

*To all whom it may concern:*

Be it known that I, GEORGE FRANÇOIS JAUBERT, doctor of science, a citizen of the French Republic, residing at 155 Boulevard Malesherbes, Paris, in the Republic of France, have invented certain new and useful Improvements in Briquets for Producing Oxygen, of which the following is a specification.

The present invention has for its object the production of cakes, blocks, or briquets liberating during their combustion practically pure oxygen. These briquets are prepared by kneading, in the presence of water or some other solvent, a mixture of an oxygenated salt, such as the perchlorates and the nitrates, with a small proportion of combustible such as carbon and of an appropriate inert material. Briquets prepared by compression in a dry state from these three elements and the process of producing oxygen or gases rich in oxygen from said briquets, are described in my co-pending application Serial 289,368 for improvements in the preparation of oxygen by the decomposition of oxygenated salts.

The briquets obtained by the compression in a dry state of a mixture of perchlorate, nitrate or other salt rich in oxygen, with pulverulent combustible such as carbon do not present sufficient cohesion to prevent their crumbling at the least shock, which renders it exceedingly difficult to handle or transport them from place to place. Further it is almost impossible, even by employing mixtures in a state of impalpable powder, to obtain by dry compression blocks which are sufficiently homogeneous to insure that each particle of combustible material shall be in immediate contact with the necessary quantity of particles capable of supporting combustion. The combustion is therefore defective and in order that it may take place uniformly necessitates a high proportion of combustible material contaminating the oxygen by the products of its combustion. In addition, the gas produced, in endeavoring to liberate itself, produces deformations and swellings of the briquet. In accordance with the present invention these defects are obviated by employing the perchlorate (or other oxygenated salt) and other ingredients not in a dry state but in adding thereto a considerable quantity of water or other solvent which may even exceed one half of the weight of the oxygenated salt employed. This water dissolves a small part of the perchlorate which, being thus dissolved, penetrates the entire mass uniformly, and after evaporation, agglomerates the briquet precisely in the manner of a cement, imparting to it the desired cohesion. The particles of combustible being uniformly covered with material capable of supporting combustion, the combustion takes place regularly with less carbon and the oxygen obtained is therefore more pure. Finally, the evaporation of the solvent leaves pores in the blocks or briquets, thus permitting the gas produced to become liberated freely without causing any considerable deformations of the mass.

The preparation of the paste serving to form the briquets may be effected either by preparing a solution of perchlorate (or other oxygenated salt employed) to which the various ingredients are added in succession, or by directly adding the water or other solvent to the other ingredients mixed in a dry state. In the first case there is dissolved in a quantity of water equal in weight to about one half of the perchlorate to be employed a small part (5% for example) of the total quantity of perchlorate to be employed, then the carbon in powder and the inert material serving to moderate the rapidity of the combustion are added to the solution obtained. In this manner an exceedingly fluid paste is obtained and this is agitated until complete homogeneity is produced. The rest of the perchlorate in the condition of a very fine powder is then added and the mass is mixed or kneaded, in a mechanical mixer for example, until a perfectly uniform paste is obtained which is cut into cakes and then thoroughly dried. If an efficient kneading apparatus is available the second method indicated may be adopted, the previous solution of a part of the perchlorate or other oxygenated salt employed being dispensed with. The three powders (perchlorate, carbon and inert material) are formed into a dry mixture, then a quantity of water slightly greater than in the preceding is added and the mass thoroughly kneaded. The paste obtained is then cut into cakes or briquets and dried. For example 100 kilograms of perchlorate of potash ($KClO_4$) in as fine a powder as possible may be mixed with 3 kilograms of wood charcoal in powder and 20 kilograms of calcined and pulverized infusorial earth. The mixture is bolted in order to render it perfectly homogeneous and then introduced with 50 to 55 liters of water into a kneading machine which is then started. As soon as the paste is homogeneous, cakes of the desired shape are formed precisely as if modeling clay were being dealt with and drying is then effected.

Numerous experiments have shown the inventor that of all the oxygenated salts perchlorate of potash gives the best results, the other perchlorates give inferior results while the nitrates give acid gas mixtures difficult to purify. These different salts may however be utilized likewise.

Having now particularly described and ascertained the nature of my said invention and in what manner the same is to be performed, I declare that what I claim is:—

1. A dry, cemented, porous, combustible, non-explosive briquet for producing oxygen, made up of an oxygenated salt associated with a combustible material, the particles of which are coated with a portion of the oxygenated salt and the quantity of which is limited to that necessary to produce, by combining with a small proportion of the oxygen, the necessary temperature of reaction for also dissociating the mass of oxygenated salt, and with a quantity of inert material for retarding the reaction; substantially as described.

2. A dry, porous, combustible, non-explosive briquet for producing oxygen made up of an oxygenated salt associated with a quantity of combustible material limited to that necessary to produce, by combining with a small proportion of the oxygen, the necessary temperature of reaction for also dissociating the mass of oxygenated salt, and with an inert material for retarding the reaction, the briquet being cemented together by a part of the oxygenated salt serving as a binding medium for the remaining particles of the mixture; substantially as described.

3. A dry, cemented, porous, combustible, non-explosive briquet for producing oxygen, made up of one hundred parts of powdered perchlorate of potash mixed with three parts of powdered charcoal, the particles of which are coated with a portion of the perchlorate of potash, and twenty parts of pulverized infusorial earth; substantially as described.

In testimony whereof I have hereunto placed my hand at Paris, France this seventh day of April 1906.

GEORGE FRANÇOIS JAUBERT.

In the presence of—
HANSON C. COXE,
HENRY SCHWAB.